3,014,972
PROCESS FOR THE PREPARATION OF ORGANIC NITRO COMPOUNDS
Donald Edward Hardies, Barberton, Ohio, Nathan Kornblum, West Lafayette, Ind., and Jack Wesley Powers, Ripon, Wis., assignors to Purdue Research Foundation, Lafayette, Ind., a corporation of Indiana
No Drawing. Filed Dec. 31, 1957, Ser. No. 706,288
4 Claims. (Cl. 260—644)

This invention relates to the preparation of organic nitro compounds, and especially to the preparation of aliphatic and alicyclic nitro compounds containing more than four carbon atoms.

This application is a continuation-in-part of our prior co-pending application Serial No. 620,201, filed November 5, 1956, now abandoned.

Much interest has been shown of late in aliphatic nitro compounds wherein the nitro group is situated on a saturated carbon atom. These compounds are generally known as nitro-alkanes or nitro-cycloalkanes, as the case may be. They may also contain aromatic substituents, in which case they are referred to as nitro-aralkanes.

The nitro-alkanes to which this invention relates have the general formula

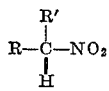

wherein R can be any organic group and R' can be any organic group or hydrogen. Despite their rather considerable interest, a satisfactory general laboratory or commercial synthesis for these nitro compounds had not been evolved. These nitro compounds are desired for use as intermediates in pharmaceutical manufacture, rocket propellants, explosives, diamine manufacture, lacquer solvents, flotation agents, wetting agents, and as research chemicals.

Of the known methods of preparing nitro-alkanes, the vapor phase nitration is most economical and satisfactory for compounds having four or less carbon atoms while the standard method of synthesizing nitro-alkanes of more than four carbon atoms has been and remains the Victor-Meyer reaction in which solid silver nitrite is reacted with the corresponding halo-alkane. This is true despite the high cost of the reactants due to the fact that when the vapor phase nitration of compounds having more than four carbons is attempted, miscellaneous oxidation and degradation products are obtained and the nitro compounds formed are part of a complex mixture of products since it is not feasible to pinpoint the nitro group onto a predetermined position of a complex molecule by the vapor phase nitration.

Efforts have been made to prepare nitro compounds by the addition of nitrogen peroxide and other nitrogen compounds to double bonds, but the results have not been satisfactory. Efforts have also been made to produce higher nitro-alkanes from nitro alcohols prepared by the reaction of aldehydes with lower nitro paraffins, but here again the results have not been too satisfactory. Attempts to oxidize aliphatic amines to the corresponding nitro compounds have not resulted in a practical commercial process.

It is an object of the present invention to provide a method of synthesizing nitro-alkanes, nitro-cycloalkanes and nitro-aralkanes in satisfactory yields. Another object of the present invention is to provide a method of introducing a nitro group at a particular position in a complex molecule. Other and additional objects will become apparent from the ensuing specification and claims.

In prior co-pending U.S. application Serial No. 505,560, filed May 2, 1955, now abandoned, in the name of Nathan Kornblum, and having a common assignee with the present application, there is disclosed a method of preparing aliphatic and alicyclic nitro compounds by reacting the ester of a primary or secondary alcohol with an alkali metal nitrite in a dimethylformamide reaction medium with an acid selected from the group consisting of hydrobromic, hydroiodic, and sulfonic acids. Additives such as catechol and urea are disclosed as useful in suppressing side reactions and/or increasing the rate of reaction. We have now found that the process described in the said Kornblum application is materially improved if the reaction is run in a dimethylsulfoxide (DMSO) reaction medium, rather than in a dimethylformamide. A more complete understanding will be gained from a consideration of the following examples:

EXAMPLE I

Preparation of 1-nitrooctane 1-bromooctane (55.42 gms., 0.3 mol) is poured into a stirred solution of 270 ml. DMSO to which is added 36 gms. NaNO$_2$ in a 500 ml. three-necked flask equipped with a sealed stirrer. The flask is stoppered and immersed in a water bath at 5° C. which is allowed to warm up to room temperature. Stirring is continued for 2 hours. The reaction mixture is then poured into 600 ml. of ice-water layered over with 200 ml. of 35–37° petroleum ether. After separation of the upper layer, the aqueous phase is extracted four more times with 75 ml. portions of the ether. The combined extracts are washed with four 100 ml. portions of water and then dried over anhydrous magnesium sulfate. The mixture is filtered with suction, the magnesium sulfate is washed with four 25 ml. portions of ether and these are combined with the filtrate.

Using a small column, the ether is removed and the residual liquid is rectified. An 18% yield (7.99 g.) of 1-octyl nitrite B.P. 30°/mm.; $n_D^{20}$ 1.4125 and a 66% yield (29.9 g.) of pure 1-nitrooctane, B.P. 61°/0.9 mm.; $n_D^{20}$ 1.4322 were obtained.

Repetition of this example at room temperature for two hours gave a 66% yield of pure 1-nitrooctane.

EXAMPLE I-A

The procedure of Example I was repeated except that 600 ml. of dimethylformamide was used in lieu of the 270 ml. of dimethylsulfoxide. After a reaction time of 6 hrs. the 1-nitrooctane was obtained in a yield of 60%.

EXAMPLE II

Preparation of 2-nitrooctane

The equipment and conditions were similar to those used in Example I. The reagents were 200 ml. of DMSO, 36 g. of NaNO$_2$ and 72.20 g. (0.3 mole) of 2-iodooctane. The reaction time was 5 hrs. The reaction mixture was worked up as in Example I. A 58% yield (27.5 g.) of 2-nitrooctane, B.P. 67°/2 mm.; $n_D^{20}$ 1.4280 and a 31% yield (14.82 g.) of 2-octyl nitrite, B.P. 37°/4 mm.; $n_D^{20}$ 1.4088 were obtained.

EXAMPLE III

Preparation of 2-nitrooctane

The equipment and conditions were similar to those used in Example I. The reagents were 200 ml. of DMSO, 36 g. NaNO$_2$ and 53.75 g. (0.3 mole) of 2-bromooctane. The reaction time was 12 hrs. On working up the reaction mixture as in Example I a 46% yield (19.9 g.) of 2-nitrooctane, B.P. 55°/1 mm.; $n_D^{20}$ 1.4280 was isolated.

EXAMPLE IV

*Preparation of nitrocyclopentane*

The equipment and conditions were similar to those used in Example I. The reagents were 100 ml. of DMSO, 18 g. $NaNO_2$ and 22.00 g. (0.15 mole) of bromocyclopentane. The reaction time was 3 hrs. and the reaction temperature 15° C. The reaction mixture was worked up as in Example I. A 58% yield (9.87 g.) of nitrocyclopentane, B.P. 62°/8 mm.; $n_D^{20}$ 1.4538 was obtained.

EXAMPLE IV-A

The procedure of Example IV was repeated except that 300 ml. of dimethylformamide was used in lieu of the 100 ml. of dimethylsulfoxide. After a reaction time of 42 hrs. nitrocyclopentane was obtained in a yield of 57%.

EXAMPLE V

*Preparation of α-phenylnitroethane*

The equipment and conditions were similar to those use in Example I. The reagents were 100 ml. of DMSO, 18 g. $NaNO_2$ and 26.0 g. (0.14 mole) of α-phenylethyl bromide. The reaction time was 55 minutes and the reaction temperature 11° C. The reaction mixture was worked up as in Example I except that after removal of α-phenylethyl nitrite by vacuum distillation the residual orange liquid was washed with 85% $H_3PO_4$ and then treated at 0° C. with 2,4-dinitrophenyl hydrazine in 2 N aqueous HCl. After filtering to remove a small amount of acetophenone 2,4-dinitrophenylhydrazone, the organic layer was dissolved in ether, washed with water, and dried over magnesium sulfate. After filtration the product was rectified. A 31% yield (6.51 g.) of colorless α-phenylnitroethane; B.P. 76°/1 mm.; $n_D^{20}$ 1.5212 was obtained.

EXAMPLE VI

*Preparation of 1-nitrodecane*

The equipment and conditions were similar to those used in Example I. The reagents were 115 ml. of DMSO, 17.2 g. $NaNO_2$ and 40.5 g. (0.15 mole) of 1-iododecane. The reaction time was 3.5 hours. The reaction mixture was worked up as in Example I. A 53% yield (14.91 g.) of pure, colorless 1-nitrodecane, B.P. 86°/1 mm.; $n_D^{20}$ 1.4387 was isolated. *Analysis.*—Calcd. for $C_{10}H_{21}NO_2$: N, 7.48%. Found, N, 7.74%.

EXAMPLE VII

*Preparation of 1-nitrobutane*

The equipment and conditions are the same as those used in Example I. The reagents are 75 ml. DMSO, 12 g. $NaNO_2$ and 22.8 g. (0.1 mole) of n-butyl p-toluenesulfonate. The reaction time is ten hours. On working up the reaction mixture as in Example I a 4.8 g. yield (47%) of 1-nitrobutane, B.P. 71°/45 mm.; $n_D^{20}$ 1.4106 is obtained.

EXAMPLE VIII

*Preparation of nitrocycloheptane*

The equipment and conditions were similar to those used in Example I. The reagents were 225 ml. DMSO, 36 g. $NaNO_2$ and 67 g. (0.3 mole) of iodocycloheptane. The reaction time was 3.5 hours. The reaction mixture was worked up as in Example I. A 55% yield (23.3 g.) of nitrocycloheptane, B.P. 72°/2 mm.; $n_D^{20}$ 1.4724.

It will be readily apparent from the foregoing examples that several important and highly significant advantages are obtained when the synthesis is conducted in a dimethylsulfoxide reaction medium as contrasted with a dimethylformamide reaction medium. Not only are higher yields obtained in dimethylsulfoxide in most instances but reaction times are materially reduced as evidenced by the following table which illustrates data from several of the foregoing examples.

TABLE I.—REACTION OF ALKYL AND CYCLOALKYL HALIDES WITH SODIUM NITRITE

| Halide used | Reaction time (hr.) | | Nitroparaffin percent yield | |
|---|---|---|---|---|
| | DMSO | DMF | DMSO | DMF |
| 1-bromooctane | 2 | 6 | 66 | 60 |
| Bromocyclopentane | 3 | 42 | 58 | 57 |

The reaction, therefore, may be represented as follows:

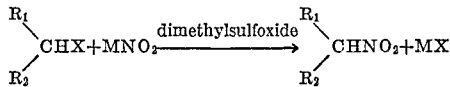

wherein $R_1$ is an alkyl or aryl radical, $R_2$ is hydrogen or an alkyl radical, or $R_1$ and $R_2$ are joined as part of a single cycloalkane segment, M is an alkali metal, and X is a halo- or sulfo-acid radical. Accordingly, suitable starting materials include the halo- and sulfo-alkanes, cycloalkanes, and aralkanes. As the alkali metal nitrite we may use lithium, sodium or potassium nitrite.

The reaction may be conducted over a wide temperature range, for example, from −20° C. to 40° C. and in most cases, room temperature is quite satisfactory.

Contrary to the case in the Kornblum application referred to above, the addition of urea is not required to increase the rate of reaction when dimethylsulfoxide is used as it is when dimethylformamide is employed as the reaction medium. The use of the urea additive is dispensed with entirely when the reaction is conducted in a dimethylsulfoxide medium. Similarly, the use of catechol as a side reaction suppressant may also be dispensed since it is not needed for a dimethylsulfoxide medium as it is with the dimethylformamide medium.

The present invention has been fully described in the foregoing. We intend to be limited, therefore, only by the following claims.

We claim:

1. A process for preparing a nitroderivative which comprises mixing in dimethylsulfoxide an alkali metal nitrite with a compound selected from the group consisting of the haloalkanes and halocycloalkanes having more than four carbon atoms and the halo- and sulfoaralkanes in which the aliphatic portion of the molecule is a lower alkyl group.

2. A process as claimed in claim 1 wherein the alkali metal nitrite is sodium nitrite.

3. A process for preparing nitrocyclopentane which comprises mixing in dimethylsulfoxide an alkali metal nitrite with a halocyclopentane.

4. A process for the preparation of a nitrocycloalkane having more than four carbon atoms which comprises mixing a halocycloalkane having more than four carbon atoms with an alkali metal nitrite in a dimethylsulfoxide reaction medium.

References Cited in the file of this patent
UNITED STATES PATENTS

| | | |
|---|---|---|
| 2,105,581 | Bender | Jan. 18, 1938 |
| 2,117,931 | Allen | Jan. 18, 1938 |
| 2,387,279 | McCracken | Oct. 23, 1945 |
| 2,883,434 | Spaeth | Apr. 21, 1959 |

OTHER REFERENCES

Chemical Week Reviews New Stepan Solvent "Dimethyl Sulfoxide." 2 page brochure.